(12) United States Patent
Grimm et al.

(10) Patent No.: US 9,928,524 B2
(45) Date of Patent: Mar. 27, 2018

(54) LEARNING DRIVER DEMOGRAPHICS FROM VEHICLE TRACE DATA

(75) Inventors: Donald K. Grimm, Utica, MI (US); Fan Bai, Ann Arbor, MI (US); Cem U. Saraydar, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1573 days.

(21) Appl. No.: 13/046,856

(22) Filed: Mar. 14, 2011

(65) Prior Publication Data
US 2012/0239471 A1 Sep. 20, 2012

(51) Int. Cl.
G06Q 30/02 (2012.01)

(52) U.S. Cl.
CPC ..... *G06Q 30/0251* (2013.01); *G06Q 30/0265* (2013.01)

(58) Field of Classification Search
CPC .................................. G06Q 30/0265
USPC ..................................... 705/14.62
See application file for complete search history.

(56) References Cited

U.S. PATENT DOCUMENTS

| 7,317,974 | B2 | 1/2008 | Luskin | |
|---|---|---|---|---|
| 2008/0103657 | A1* | 5/2008 | Norton | G06Q 10/08 701/33.4 |
| 2009/0006194 | A1* | 1/2009 | Sridharan | G06Q 30/02 705/14.62 |
| 2009/0167559 | A1* | 7/2009 | Gaddy | G08G 1/0962 340/901 |
| 2010/0088181 | A1* | 4/2010 | Crolley | G06O 30/0261 705/14.63 |
| 2010/0131642 | A1* | 5/2010 | Chalikouras | G06Q 30/02 709/224 |

FOREIGN PATENT DOCUMENTS

DE 102008036023 12/2009

* cited by examiner

*Primary Examiner* — William A Brandenburg
(74) *Attorney, Agent, or Firm* — Quinn IP Law

(57) ABSTRACT

A method of providing advertising content targeted to an operator of a vehicle. Vehicle data acquisition devices are employed to collect operator attribute information from vehicle trace data of the vehicle as the operator operates the vehicle. A processor of the vehicle applies a statistical analysis on the operator attribute information for determining a probability of demographic characteristics of the operator of the vehicle. The demographic characteristics of the operator are identified as a function of the determined probability. The vehicle communicates the targeted advertising content to the operator of the vehicle.

20 Claims, 2 Drawing Sheets

LEARNING DRIVER DEMOGRAPHICS FROM VEHICLE TRACE DATA

BACKGROUND OF INVENTION

An embodiment relates generally to vehicle networking.

Advertising is commonly communicated to users of media devices in the hopes that one of the many advertisements might be of interest to a user of the media device. For example, a user that is online on the internet may visit various websites. Advertising content may be a paid for advertisement that has no bearing to the information content of the site or the information may relate in some manner to the information being provided on the site. The hope is that the advertisement content will strike an interest with the user. However, in such a situation, it is the visitation of the site by the user that provides some details to the advertiser as to what interests the user may have.

In other types of communications, such as cell phones or email, advertisements of random content are provided to the user via text message or email message. Commonly, such advertisements are nuisances to the operator since the advertiser has no prior knowledge of the interests of the user.

For an operator of a vehicle, providing advertisement to a user through a multimedia device is more or less a hit-or-miss process. A radio station may provide targeted advertisement content over a particular station based on the type of music played on that station which would give a small amount of insight to possibly the age group listening to the station. For an operator of a vehicle, other than advertising based on an expected audience of the radio station, there is typically no process that estimates the interest of the user so that advertising content specific to the operator may be provided.

SUMMARY OF INVENTION

An advantage of an embodiment is an identification of demographic characteristics of an operator of the vehicle based on vehicle trace data, and the automated communication to the operator of the target advertising content which may relate to the nearby events. The target advertising content of nearby events is selected as it relates to the identified demographic characteristics of the operator of the vehicle. Communication of the target advertising content may be prevented if there is a determination of external constraints that are ongoing that would disinterest the operator of the vehicle from attending the event.

An embodiment contemplates a method of providing advertising content targeted to an operator of a vehicle. Vehicle data acquisition devices are employed to collect operator attribute information from vehicle trace data of the vehicle as the operator operates the vehicle. A processor of the vehicle applies a statistical analysis on the operator attribute information for determining a probability of demographic characteristics of the operator of the vehicle. The demographic characteristics of the operator are identified as a function of the determined probability. The vehicle communicates the targeted advertising content to the operator of the vehicle.

An embodiment contemplates a method of providing advertising content targeted to an operator of a vehicle. Vehicle data acquisition devices are employed to collect operator attribute information from vehicle trace data of the vehicle as the operator operates the vehicle. The vehicle trace data relates to historical information derived from a group that includes at least one of operator detection information, driving route information, operator driving behavior information, media accessory usage information, and multimedia content usage information. A processor applies a statistical analysis on the operator attribute information for determining a probability of demographic characteristics of the operator of the vehicle. The demographic characteristics of the operator are identified based on the determined probability that includes at least one of an operator gender, an operator age, and an operator income. The vehicle communicates the targeted advertising content to the operator as it relates to demographic characteristics of the operator

DETAILED DESCRIPTION

Figure 1:
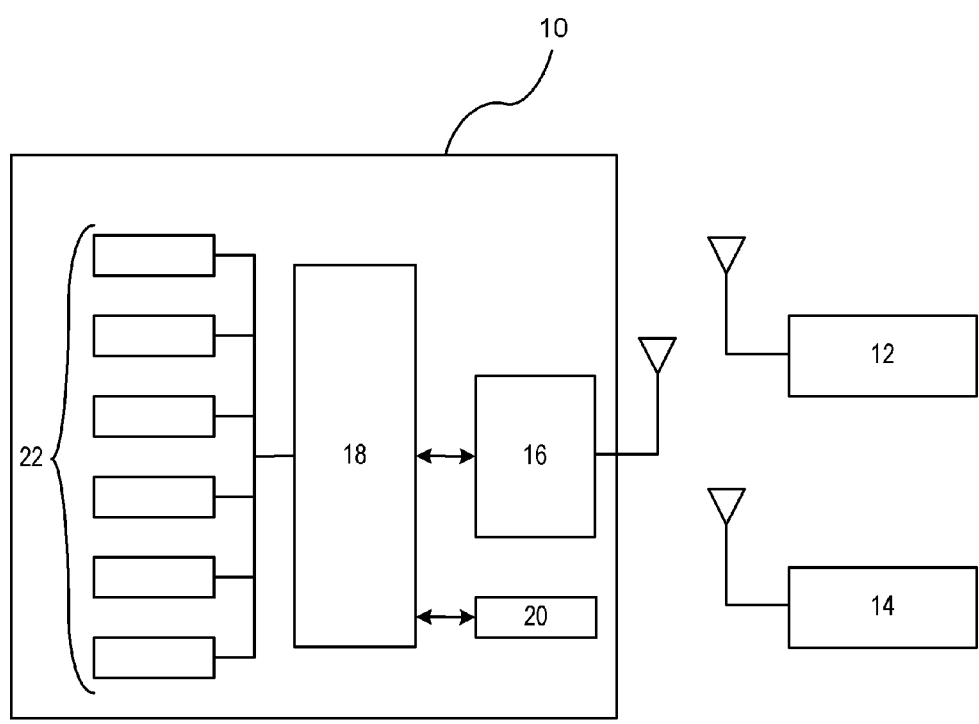
FIG. 1 is a block diagram of a V2X communication system.

There is shown generally in FIG. 1 a host vehicle 10 in communication with remote entities that may include remote vehicles 12 and fixed infrastructures 14. The communication capability between the host vehicle 10 and the remote entities is known as V2X communications. The host vehicle 10 and the remote entities send wireless messages to one another over a respective inter-vehicle communication network (e.g., DSRC) for exchanging information. A dedicated short range communications radio (DSRC) 16 is provided for transmitting and receiving messages to and from host vehicle 10. Each vehicle collects information relating to respective places of interest and may exchange such information with other remote entities. The host vehicle 10 includes a processor 18 for processing incoming and outgoing messages with remote entities.

The fixed infrastructure 14 may include roadside equipment or may include another fixed entity such as a place of business or service. The place of business or service may broadcast the type of services that it provides (e.g., gas station, restaurant, entertainment) when the host vehicle 10 is within a broadcasting range. In addition, the remote vehicle 12 may receive information relating to the place of business or service and forward such information to the host vehicle 10.

The host vehicle 10 further includes a human machine interface (HMI) 20 for communicating with the operator of the vehicle. The HMI 20 may communicate information to an operator of the vehicle as well as allowing the operator to enter information to the HMI 20.

The host vehicle 10 includes a plurality of vehicle data acquisition devices 22 for obtaining attribute information that assists in estimating demographic characteristics of the operator of the vehicle. Examples of data acquisition devices 22 include, but are not limited to, sensors (e.g., seat position, HVAC settings, adaptive cruise control following gap), occupant detection devices (e.g., face camera, occupant sensing device, seatbelt detection device), GPS trace and map trace devices, vehicle accessories, and multi-media devices.

The processor 18 receives the information from the data acquisition devices 22, analyzes the information, and determines a probability of demographic characteristics of the operator. As a result of the estimated demographic characteristics of the operator, targeted advertising content may be communicated to the operator of the vehicle. Target advertising content may relate to an event that is within a proximity of the vehicle where the event has potential interest to the operator based on the associated identified demographic characteristics.

The processor 18 may further include a filtering algorithm that determines whether an external constraint is present that may be a deterrent for communicating the event to the operator. However, if an external constraint is present, the targeted advertising content relating to an event may not be communicated to the operator of the vehicle.

Figure 2:
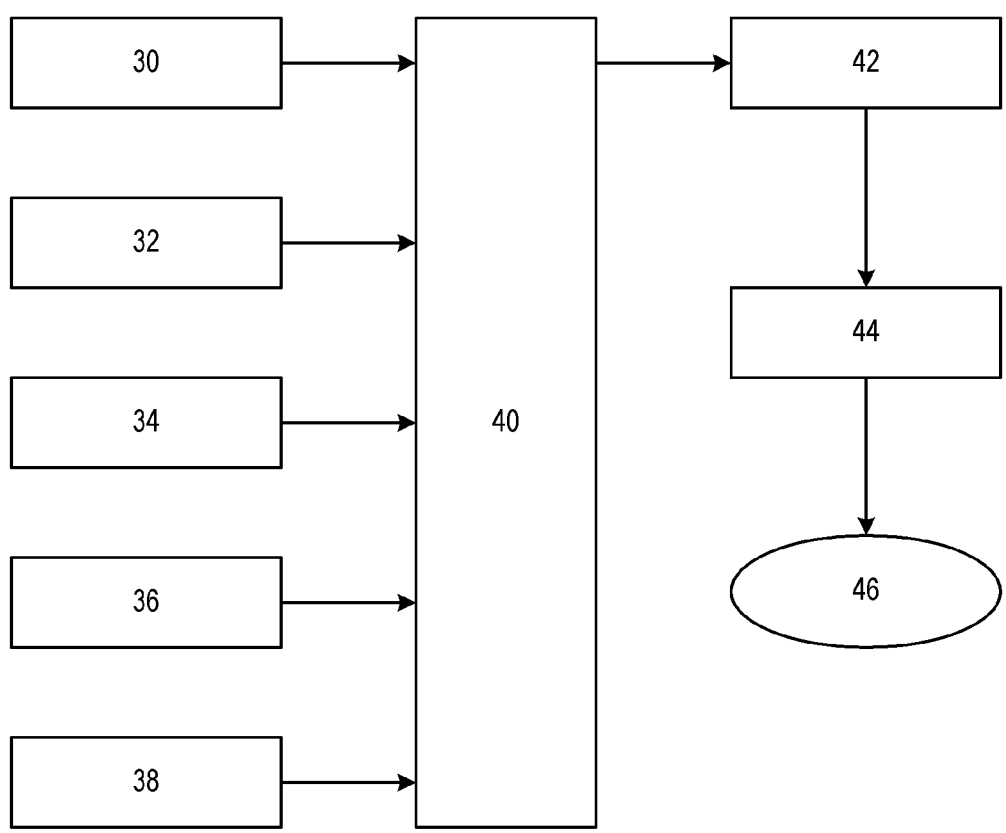
FIG. 2 is a flow diagram for estimating demographic characteristics of an operator of a vehicle.

FIG. 2 illustrates a flow diagram for inferring demographic characteristics using vehicle traces. Blocks 30-38 illustrate types of vehicle traces that provide information in which demographic characteristics of the operator of the vehicle may be analytically determined. Block 30 represents occupant sensing device traces that provide information that assist in identifying demographic characteristics of the occupant. Such devices include, but are not limited to, occupant detection devices, face recognition devices, seatbelt activation devices, seat sensors, weight sensors.

Block 32 represents micro-mobility traces relating to operator driving attribute data. Operator driving attribute data involves information relating to the operator's driving habits or driving behaviors. Such operator driving attribute data includes, but is not limited to, an operator's driving style, turn signal usage, refueling behavior, driving speed (e.g., whether the speed is above or below a speed limit).

Block 34 represents macro-mobility traces relating to driving route behavioral data. Driving route behavioral data includes, but is not limited to, driving routes from origin to destination, the roads driven, places visited, duration of time spent at a location, and driving time. Driving route behavior data may be obtained from devices such as GPS and other types of map data.

Block 36 represents content access traces relating to multi-media content utilized within the vehicle. Examples of multimedia content utilized within the vehicle include, but are not limited to, AM/FM radio setting, satellite stations settings and usage, and rear seat entertainment usage.

Block 38 represents online traces relating to personal accommodating devices utilized within the vehicle. Online traces may show types of web usage, phone usage, playlists (e.g., music, genre, etc).

One or more of the vehicle traces obtained in blocks 30-38 are input into a statistical analysis program 40. The statistical analysis program may utilize analytical techniques that include, but are not limited to, Bayesian probability analysis. Bayesian techniques utilize a prior probability, which is then updated with more recent and relevant data. Bayesian utilizes the concept of probability as a measure of a state of knowledge as opposed to interpreting the data as a frequency. For example, inferring gender information from macro-mobility traces would utilize prior probability of a generic population for visiting the following places for a male and a female. The following represents a known probability of a male visiting the following events:
$P(M|S_j):P(M|gym)$, $P(M|mall)$, $P(M|library)$, $P(M|grocery)$ . . . .
whereas the following represents a known probability of a female visiting the following events:
$P(F|S_j):P(F|gym)$, $P(F|mall)$, $P(F|library),P(F|grocery)$ . . . .
Utilizing gender as an demanded demographic characteristic, the gender of an operator of the vehicle $u_i$ (using macro-mobility traces) can be inferred as to whether the operator is a male utilizing a Bayesian analysis probability formula as follows:

$$P(u_i = M) = P(M \mid \{S_j\})$$
$$= P(\{S_j\} \mid M)P(M)$$
$$= \sum_{j=1}^{N} P(S_j \mid M)P(M)$$
$$= \frac{\sum_{j=1}^{N} P(M \mid S_j)P(S_j)}{P(M)} P(M)$$
$$= \sum_{j=1}^{N} P(M \mid S_j)P(S_j)$$

where $S_j$ represents a specific hypothesis, M represents the evidence that has been observed for a male, $P(S_j)$ represents a prior probability of $S_j$ that was inferred before the availability of the evidence M, $P(M)$ represents probability that subject M occurs in a given population, $P(M|S_j)$ represents a conditional probability of the evidence M if the specific hypothesis $S_j$ is true, $P(S_j|M)$ represents a posterior probability of the specific hypothesis $S_j$ given the evidence M and is the new estimate of the probability that the hypothesis $S_j$ is true taking evidence M into consideration.

The gender of an operator of the vehicle $u_i$ (using macro-mobility traces) can be inferred as to whether the operator is a female utilizing a Bayesian analysis probability formula as follows:

$$P(u_i = F) = P(F \mid \{S_j\})$$
$$= P(\{S_j\} \mid F)P(F)$$
$$= \sum_{j=1}^{N} P(S_j \mid F)P(F)$$
$$= \frac{\sum_{j=1}^{N} P(F \mid S_j)P(S_j)}{P(F)} P(F)$$
$$= \sum_{j=1}^{N} P(F \mid S_j)P(S_j)$$

where $S_j$ represents a specific hypothesis, F represents the evidence that has been observed for a female, $P(S_j)$ represents a prior probability of $S_j$ that was inferred before the availability of the evidence F, $P(F)$ represents probability that subject F occurs in a given population, $P(F|S_j)$ represents a conditional probability of the evidence F if the specific hypothesis $S_j$ is true, $P(S_j|F)$ represents a posterior probability of the specific hypothesis $S_j$ given the evidence F and is the new estimate of the probability that the hypothesis $S_j$ is true taking evidence F into consideration.

The probability for the demographic characteristics may be further refined by weighting each determined probability associated with each vehicle trace data. That is, a weighting factor may be applied to each respective probability of each respective trace to produce an overall estimation of the demographic characteristic. This is performed when a confidence of one or more of the traces have greater or lesser likelihood of factoring into the determination of the demographic characteristics. The following equations may be applied by the processor to determine an overall probability of demographics characteristics:

$$P(u_i = M) = W_{Macro-Mobility} P_{Macro-Mobility}(u_i = M) +$$
$$W_{Micro-Mobility} P_{Micro-Mobility}(u_i = M) +$$
$$W_{Content-Consumption} P_{Content-Consumption}(u_i = M) +$$
$$W_{Online-Behavior} P_{Online-Behavior}(u_i = M) +$$
$$W_{Sensor-Data} P_{Sensor-Data}(u_i = M)$$

where $u_i$=M gender of the operator, $W_{Macro-Mobility}$ is a desired weighting factor associated with the macro-mobility trace data, $W_{Micro-Mobility}$ is a desired weighting factor associated with the micro-mobility trace data, $W_{Content-Consumption}$ is a desired weighting factor associated with the content-consumption trace data, and $W_{Online-Behavior}$ is a desired weighting factor associated with the online-behavior trace data and $W_{Sensor-Data}$ is a desired weighting factor associated with the sensing trace data. The weighting factors of all combined traces must add up to 100%. This is represented by the following formula:

$$W_{Sensor-Data} + W_{Content-Consumption} + W_{Micro-Mobility} + W_{Content-Consumption} + W_{Online-Behaviour} = 100\%$$

In block 42, the probability for one or more demographic characteristics are output from the statistical analysis program that include, but are not limited to, probability of the age P(age) probability of the gender P(gender) and probability of income P(income).

Once the demographic characteristic data of the operator of the vehicle is determined, messages or advertisements relating to a service, event, or similar, as described earlier, may be communicated to the operator of the vehicle via the HMI. The term event as used hereinafter is meant to be inclusive of any type of place or business, service, or other occurrence that the operator would be interested in attending. The event is made known to the vehicle by a communication from a fixed infrastructure or remote vehicle. Moreover, information relating to such events may be obtained by in-vehicle devices such as GPS devices that have information stored in its memory (e.g., restaurant or entertainment center). Moreover, services like OnStar® which is a subscription-based communications service currently provided on vehicles manufactured by General Motors may provide such information to the vehicle. If the determination is made that the event is one that the operator of the vehicle may have an interest based on the determined demographic characteristics of the operator, then the system can either communicate the event to the operator in the form of the targeted advertisement content or the event may be filtered prior to being communicated which may prevent communication of the event to the operator.

In block 44, a filter is provided that determines whether any external constraints are present that may be a deterrent for communicating the targeted advertisement content to the operator of the vehicle. An external constraint is a condition that is taking place that would cause a disinterest to the operator from attending the event. An example would be a restaurant in the vicinity of the vehicle that is of interest to the operator based on the demographic characteristics, but the wait time for a table is over an hour. In such a case, the system would refrain from communicating the targeted advertising content to the operator based on the length of the wait time. Another example would be if a zoo is present in the vicinity, but the current weather condition is raining. The system would identify this as an external constraint and not notify the operator of the vehicle of the event. The external constraints may be further refined which sets the limits as to whether the external constraint is applied. For example, in the scenario of the restaurant, the operator of the vehicle could establish a time limit such that the operator only wants to be notified if the wait time is less than 30 minutes. In the scenario of the zoo, the operator could place weather condition limits such as a temperature condition (e.g., 50°-80° F.) if the event were taking place outside.

In block 46, the vehicle communicates the targeted advertising content to the operator of the vehicle via an HMI. The HMI may include visual communication (e.g., an in-vehicle navigation screen or multi-media screen). Alternatively, the targeted advertising content may be communicated audibly to the operator via an HMI. In yet another alternative, a portable personal device carried by the user that links to the vehicle may be used to communicate the targeted advertising content to the operator of the vehicle. In yet another alternative, advertisements or marketing information may be communicated to the operator at a later time using electronic form of communication such as email or a printed form of communication using such as postal mail.

It should be understood that the above methodologies are exemplary and that the demographic characteristics may be inferred using any of the other types of vehicle traces described. Moreover, the probability of demographic characteristics are not limited to gender, age, and income.

While certain embodiments of the present invention have been described in detail, those familiar with the art to which this invention relates will recognize various alternative designs and embodiments for practicing the invention as defined by the following claims.

What is claimed is:

1. A method of providing targeted advertising content to an operator of a vehicle, the method comprising:
    employing vehicle data acquisition devices to collect operator attribute information from vehicle trace data of the vehicle as the operator operates the vehicle;
    a processor of the vehicle applying a statistical analysis on the operator attribute information for determining a probability of demographic characteristics of the operator of the vehicle, the probability of demographic characteristics of the operator based on the operator attribute information is weighted based on a likelihood that at least one group of operator attribute information has a greater influence of impacting the determination of the demographic characteristics;
    identifying demographic characteristics of the operator as a function of the determined probability; and
    selecting the targeted advertising content using the identified demographic characteristics of the operator;
    communicating, via the vehicle, the targeted advertising content to the operator of the vehicle.

2. The method of claim 1 wherein communicating the event to the operator further comprises:
    determining whether an external constraint is present that is a deterrent for communicating the target advertising content to the operator; and
    communicating the target advertising content to the operator only if no external constraint is present.

3. The method of claim 2 wherein communicating the event to the operator further comprises the steps of:
    determining whether an external constraint is present that is a deterrent for communicating the target advertising content to the operator; and communicating the target advertising content to the operator only if no external constraint is present.

4. The method of claim 3 wherein the external constraint is customizable by the operator of the vehicle.

5. The method of claim 2 wherein the event is detected utilizing GPS location detection.

6. The method of claim 2 wherein the event is communicated to the vehicle from a remote entity.

7. The method of claim 6 wherein the remote entity is a remote vehicle that communicates the event to the vehicle.

8. The method of claim 6 wherein the remote entity is a fixed infrastructure that communicates the event to the vehicle.

9. The method of claim 1 wherein determining a probability of demographic characteristics of the operator of the vehicle includes determining a probability of the operator's gender.

10. The method of claim 1 wherein determining a probability of demographic characteristics of the operator of the vehicle includes determining a probability of the operator's age.

11. The method of claim 1 wherein determining a probability of demographic characteristics of the operator of the vehicle includes determining a probability of the operator's income.

12. The method of claim 1 wherein the data acquisition devices include occupant sensing devices for detecting a type of occupant seated in the vehicle.

13. The method of claim 1 wherein the data acquisition devices collect driving habit-related data of the operator.

14. The method of claim 1 wherein the data acquisition devices collect driving route behavioral data of the operator.

15. The method of claim 1 wherein the data acquisition devices collect media accessory usage of the operator.

16. The method of claim 1 wherein the data acquisition devices collect multi-media content usage of the operator.

17. The method of claim 1 wherein the targeted advertising content is communicated to the operator via a vehicular human machine interface device.

18. The method of claim 1 wherein the targeted advertising content is communicated to the operator via a personal portable communication device.

19. The method of claim 1 wherein the targeted advertising content is communicated to the operator at a later time using an electronic form of communication.

20. The method of claim 1 wherein the targeted advertising content is communicated to the operator at a later time using printed form of communication.

* * * * *